(12) United States Patent
Centen et al.

(10) Patent No.: US 8,734,161 B1
(45) Date of Patent: May 27, 2014

(54) CPR TRAINING SYSTEM USING CONSUMER ELECTRONIC DEVICE

(75) Inventors: Corey James Centen, Toronto (CA); Sarah Ann Smith, Hamilton (CA)

(73) Assignee: Physio-Control, Inc., Redmond, WA (US)

( * ) Notice: Subject to any disclaimer, the term of this patent is extended or adjusted under 35 U.S.C. 154(b) by 451 days.

(21) Appl. No.: 12/839,295

(22) Filed: Jul. 19, 2010

Related U.S. Application Data

(60) Provisional application No. 61/226,526, filed on Jul. 17, 2009.

(51) Int. Cl.
*G09B 23/28* (2006.01)
(52) U.S. Cl.
USPC .......................................... 434/262; 434/265
(58) Field of Classification Search
USPC ......................................................... 434/265
See application file for complete search history.

(56) References Cited

U.S. PATENT DOCUMENTS

| | | | | |
|---|---|---|---|---|
| 3,199,225 | A * | 8/1965 | Robertson et al. | 434/265 |
| 3,562,924 | A * | 2/1971 | Baerman et al. | 434/265 |
| 5,540,592 | A * | 7/1996 | Scheinberg et al. | 434/265 |
| 6,306,107 | B1 * | 10/2001 | Myklebust et al. | 600/587 |
| 7,122,014 | B2 * | 10/2006 | Palazzolo et al. | 601/41 |
| 7,223,103 | B2 * | 5/2007 | Cantrell et al. | 434/265 |
| 2004/0267325 | A1 * | 12/2004 | Geheb et al. | 607/5 |
| 2008/0145827 | A1 * | 6/2008 | Strand et al. | 434/265 |
| 2008/0171311 | A1 * | 7/2008 | Centen et al. | 434/265 |
| 2008/0300518 | A1 * | 12/2008 | Bowes | 601/41 |
| 2008/0312565 | A1 * | 12/2008 | Celik-Butler et al. | 601/43 |
| 2009/0035740 | A1 * | 2/2009 | Reed et al. | 434/265 |
| 2010/0021876 | A1 * | 1/2010 | Clash | 434/265 |

OTHER PUBLICATIONS

Takahashi, Dean. [online]. "Nintendo's got game." Source Electronic Busniness, v32 n8 p. 24(1). TecTrends Informations Sources, Inc. Aug. 2006. [retrieved on May 10, 2012]. Retreived from Internet: <URL:www.tectrends.com/cgi/showan?an=00162784>.*

Byers, Christin.[onliine] "Mo. paramedic hopes to reinvent CPR traing with Web site." The St. Louis Post-Dispatch. Apr. 2, 2009. [retrieved on May 10, 2012]. Retrieved from Internet: <URL:htpwww.ems1.com/es-products/cpr-resuscitation/articles47845-Mo-paramedic-hopes-to-reinvent-CPR-training-with-Web-site>.*

"Students' Nintendo Wii CPR earns American Heart Association Suport." [online]. Press Release. Source: University of Alabama at Birmingham. Web. Phys.org . Jul. 10, 2009. [retrieved on May 3, 2012]. Retrieved from Internet:<URL:htp://phys.org/wire-news/8694221/students-nintendo-wii-cpr-earns-amerian-heart-association-suppo.html>.*

(Continued)

*Primary Examiner* — Xuan Thai
*Assistant Examiner* — Michael Grant
(74) *Attorney, Agent, or Firm* — Marger Johnson & McCollom PC

(57) ABSTRACT

Embodiments of the invention provide a facility for measuring critical CPR parameters during first aid training. Specifically, the device provides a manikin housing for the insertion of a consumer electronic device such as phone, music player, personal assistant, game controller or other device with necessary sensory for the measurement of the CPR parameters. Tactile buttons, touch sensitive displays and embedded accelerometers in these devices may be used to accurately measure CPR parameters. In certain embodiments, parameters may be measured using a game console controller and the feedback may be displayed on a television in the form of a video game.

36 Claims, 14 Drawing Sheets

Enclosure having head tilt measuring facility

(56) References Cited

OTHER PUBLICATIONS

Ostrovsky, Gene. [online]. "iPhone CPR App Analyzes, Helps Improve Chest Compressions." Net News. Web. Nov. 25, 2009. [retrieved on May 8, 2012]. Retrieved from Internet:<URL:http://medgadget.com/2009/11/iphone-cpr-app-analyzes-helps-improve-chest-compressions.html>.*

"PocketCPR Device Recieves FDA Clearance as an Over-the-Counter Rescue Device." [online]. Press Release. Web. Nov. 13, 2007. [retrieved on May 10, 2012]. Retrieved from Internet:<URL:www.pocketcpr.com/pdf/prs_r/s_11_13_08.pdf>.*

* cited by examiner

Enclosure having cavity for removable sensing equipment

Enclosure having restoration spring

Cavity including air reservoir for
teaching rescue breaths

Measuring breathing technique

Wireless feedback display

Tethered feedback display

Integrated sound and light display

Communication with gaming system

Enclosure having alignment groove

Feedback display as game

Cover

Cover

Touchpad cover

Touchpad cover

Enclosure having head tilt
measuring facility

Enclosure having head tilt
measuring facility

Infant sized enclosure

CPR TRAINING SYSTEM USING CONSUMER ELECTRONIC DEVICE

FIELD OF THE INVENTION

This invention generally relates to the measurement of chest compression depth and other CPR parameters when during cardiopulmonary resuscitation (CPR) training. More specifically, this invention relates to a manikin housing for the insertion of a phone, music player, personal assistant, game controller or other removable, portable device having sensors that can be used for the measurement of the CPR parameters.

BACKGROUND OF THE INVENTION

There are currently an estimated 40,000 incidences of cardiac arrest every year in Canada, most of which take place outside of hospital settings. The odds of an out-of-hospital cardiac arrest currently stand at approximately 5%. In the U.S., there are about 164,600 such instances each year, or about 0.55 per 1000 population. There is a desire to decrease these out-of-hospital incidences of cardiac arrest. Certain places, such as sports arenas, and certain classes of individuals, such as the elderly, are at particular risk and in these places and for these people, a convenient solution may be the difference between survival and death.

Cardiopulmonary resuscitation (CPR) is a proven effective technique for medical and non-medical professionals to improve the chance of survival for patients experiencing cardiac failure. CPR forces blood through the circulatory system until professional medical help arrives, thereby maintaining oxygen distribution throughout the patient's body. However, the quality of CPR is often poor. Memory retention of proper CPR technique and protocol may be inadequate in most individuals and the anxiety of an emergency situation may confuse and hinder an individual in delivering proper treatment.

According to the journal of the American Medical Association (2005), cardiopulmonary resuscitation (CPR) is often performed inconsistently and inefficiently, resulting in preventable deaths. Mere months after the completion of standard CPR training and testing, an individual's competency at performing effective chest compressions often deteriorates significantly. This finding was found to hold true for untrained performers as well as trained professionals such as paramedics, nurses, and even physicians.

The International Liaison Committee on Resuscitation in 2005 described an effective method of administering CPR and the parameters associated with an effective technique. Parameters include chest compression rate and chest compression depth. Chest compression rate is defined as the number of compression delivered per minute. Chest compression depth is defined as displacement of the patient's sternum from its resting position. An effective compression rate may be 100 chest compressions per minute at a compression depth of about 4-5 cm. According to a 2005 study at Ulleval University Hospital in Norway, on average, compression rates were less than 90 compressions per minute and compression depth was too shallow for 37% of compressions.

Other studies have found similar deficiencies in the delivery of CPR. One 2005 study at the University of Chicago found that 36.9% of the time, fewer than 80 compressions per minute where given, and 21.7% of the time, fewer than 70 compressions per minute were given. The chest compression rate was found to directly correlate to the spontaneous return of circulation after cardiac arrest, so it is very important that the optimum rate be achieved for maximum chances of patient survival.

In addition to too shallow compressions, too forceful compressions may also be problematic. Some injuries related to CPR are injury to the patient in the form of cracked ribs or cartilage separation. Such consequences may be due to excessive force or compression depth. Once again, lack of practice may be responsible for these injuries.

Positioning of the hands is another parameter that may be considered when delivering CPR. It has been found that an effective position for the hands during compression is approximately two inches above the base of the sternum. Hand positioning for effective CPR may be different depending on the patient. For example, for performing CPR on an infant, an effective position may be to use two fingers over the sternum.

It has been shown through numerous studies that one of the primary reasons behind poor CPR quality is a lack of effective CPR training. Many individuals are apprehensive to take lessons in an unfamiliar environment. Others forget their skills soon after the completion of training. Therefore, a device that allows an individual to be trained and re-trained in CPR in the comfort of their home at minimal cost is desired.

Embodiments of the present invention include a device that enables the use of removable and portable electronic devices, such as consumer electronic devices with appropriate internal sensory to be used in the objective training of proper CPR technique. Such devices include an enclosure that houses the electronic device, which may be, for example, a cellular phone, personal digital assistant, game console controller or other digital device. In a preferred embodiment, the electronic device may contain an accelerometer or other type of sensor capable of measuring motion, movement or position.

The enclosure housing the electronic device may be, in some embodiments, a manikin resembling a human or human torso. In a preferred embodiment, the enclosure may possess the characteristics of a human chest. The enclosure may contain a spring or other similar component enabling the enclosure to be resistively compressed during the CPR training process. The amount of force required to compress the enclosure a specific distance may be similar or identical to that require to compress a real human chest. The enclosure may completely enclose the electronic device or may leave a portion of the device exposed. In a preferred embodiment, the enclosure is a spring loaded manikin having the electronic device inserted into a cavity in the chest area.

Embodiments of the present invention may also incorporate a feedback device capable of relaying CPR data to a student using the device. The feedback device may be a separate component with a facility to relay relevant data both visually and audibly. The feedback device may communicate with the electronic device within the enclosure through a number of ways. The feedback device may be tethered to the enclosure or the electronic device within the enclosure. Alternatively, it may communicate with the electronic device through wireless communication such as Bluetooth or wifi. If the enclosed electronic device is a game console controller, the feedback may be displayed on a television screen and the data may be transmitted to the console wirelessly or through the controller's tether. The feedback may be relayed to the user or student in the form of an interactive game incorporating challenges and simulations.

Embodiments of the present invention may be capable of determining chest compression depth and rate. The depth may be measured using a sensor within the electronic device, such as the accelerometer inside the Apple iPhone or the Nintendo Wii game console controller. The depth and rate of chest compressions may be calculated using other sensor modalities within these devices.

Other CPR relevant parameters may also be determined, such as chest recoil and proper hand position of the student. For example, tactile buttons or touch screens may be used to determine proper chest recoil by detecting the full release of the student's hands following a chest compression. Proper compressions require full chest release and the activation and deactivation of certain buttons may be used to signal this release. Buttons may also be used to determine proper hand position. The device may be configured so that proper hand placement during CPR activates certain buttons on the electronic device. These buttons, when activated, denote the hands being properly placed. The touch sensitive display on certain electronic devices may be used instead of the buttons to determine chest recoil and hand position. The force applied to the display may be used to determine proper chest release following a compression. Proper distribution of force across the display may also be detected and used to determine proper hand placement. This is particularly suited to multi-touch display devices such as the Apple iPhone or iPod touch music player.

Embodiments of the present invention may also incorporate a facility for detecting proper ventilations. A ventilation bag, which may be replaceable, may be placed within the enclosure and beneath the electronic device. A proper ventilation delivered by the student may inflate the bag causing the electronic device to rise a certain height dependent on the volume of air. The amount of movement of the electronic device may then be determined using its internal sensors, such as an accelerometer. The volume of each ventilation delivered by the student to the enclosure may be measured accurately and shown to the student.

BRIEF DESCRIPTION OF THE DRAWINGS

Aspects of the present invention will be discussed in detail below, with reference to the drawings in which.

DETAILED DESCRIPTION

Figure 1:
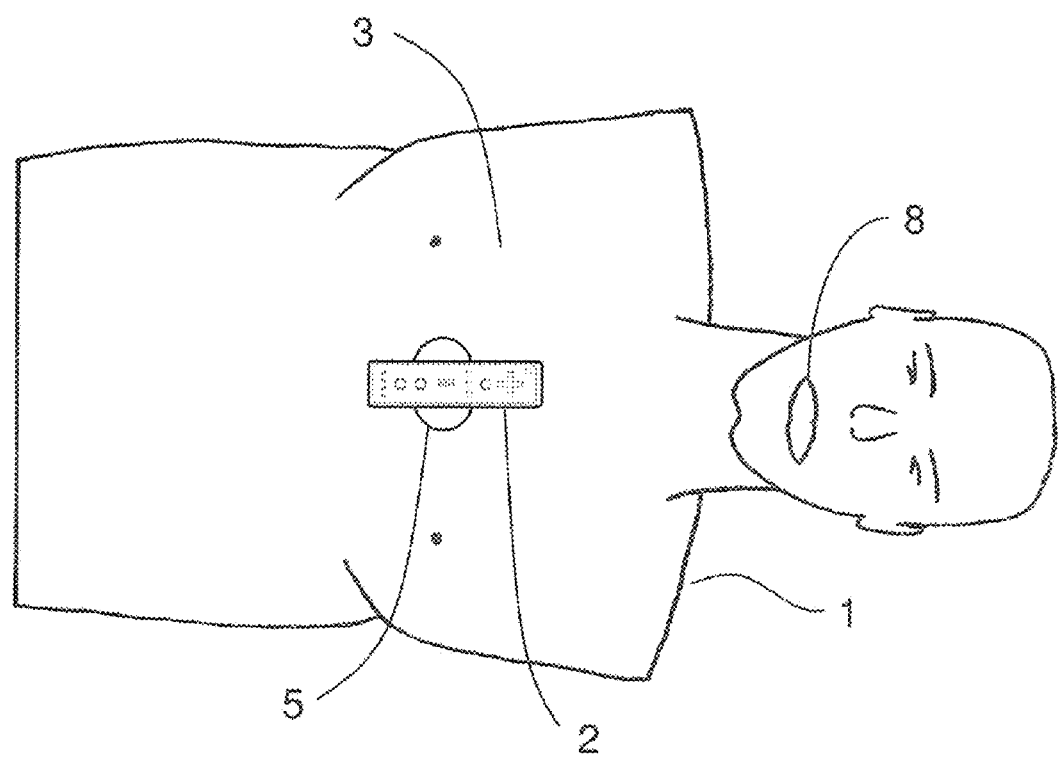
FIG. 1 is a top view of an enclosure in the form of human torso with an electronic device inserted into its chest within a receiving portion, according to embodiments of the invention.

Embodiments of the present invention include devices capable of utilizing components and functions of certain electronic devices into an effective, objective CPR training system. As shown in FIG. 1, the device may take the form of an enclosure 1 capable of holding a consumer electronic device 2 in an appropriate position, so that the sensors within the electronic device may be used to measure relevant CPR parameters. In a preferred embodiment, the electronic device 2 may be a cellular phone, personal digital assistant, game console controller or other digital device containing an accelerometer or other type of sensor capable of measuring motion, movement or position.

Figure 2:
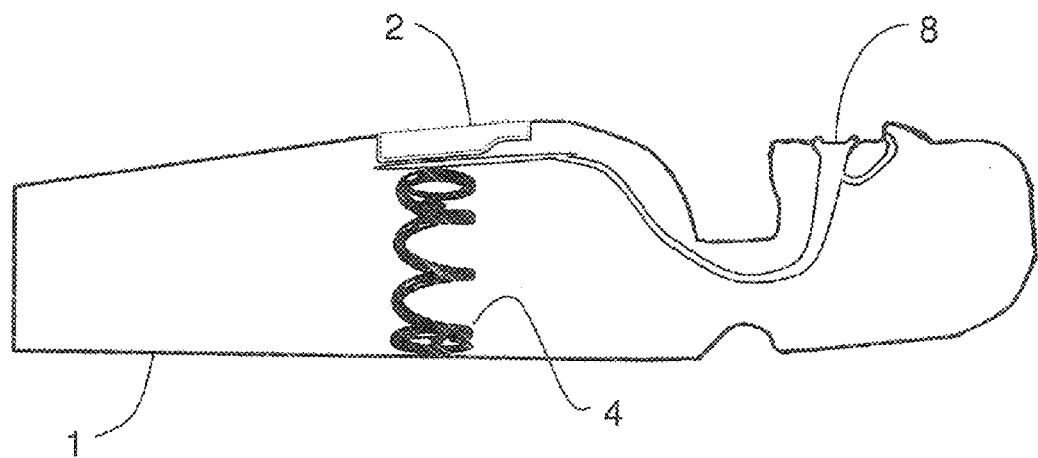
FIG. 2 is a side view of an enclosure in the form of a human torso showing the spring beneath the electronic device, according to embodiments of the invention.

The enclosure 1 may take the form of a manikin resembling a human or human torso. In a preferred embodiment, the enclosure may possess the physical characteristics of a human chest 3. As shown in FIG. 2, the enclosure may further contain a spring 4 or other similar component enabling the enclosure to be compressed, under resistance of the spring, during the CPR training process. The spring 4 may be sized or selected such that the amount of force required to compress the enclosure 1 a specific distance may be similar or identical to that require to compress a real human chest. The enclosure 1 may completely enclose the electronic device 2 so that it is not visible to a user, such as the student, and is completely concealed. The electronic device 2 may be inserted inside a cavity 5 or slot within the enclosure 1 and a lid or top may be placed over the device to protect it and provide comfort for the student. Alternatively, the electronic device 2 may be inserted into a cavity 5, leaving a portion of the electronic device exposed to the rescuer or student. The cavity 5 holding the electronic device 2 may be positioned directly above the spring 4. The spring 4 may have a spring constant that closely matches the compliance of a real human chest. The cavity 5 may be configured to hold various shapes and styles of electronic devices. If the enclosure 1 is designed to work with a specific model of cell phone, for instance, the cavity 5 may be shaped and formed to comfortably fit that specific device. The cavity 5 itself may be interchangeable so that the same enclosure 1 may be used for many different devices. The individual cavities 5 that hold the various devices 2 may be removed and reinserted into the enclosure 1.

Figure 3:
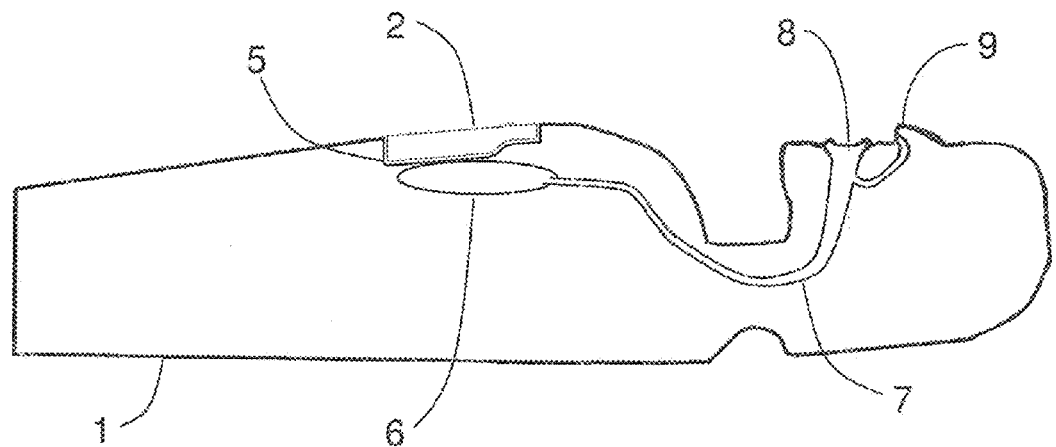
FIG. 3 is a side view of an enclosure in the form of a human torso showing the ventilation bag beneath the electronic device, according to embodiments of the invention.
Figure 4:
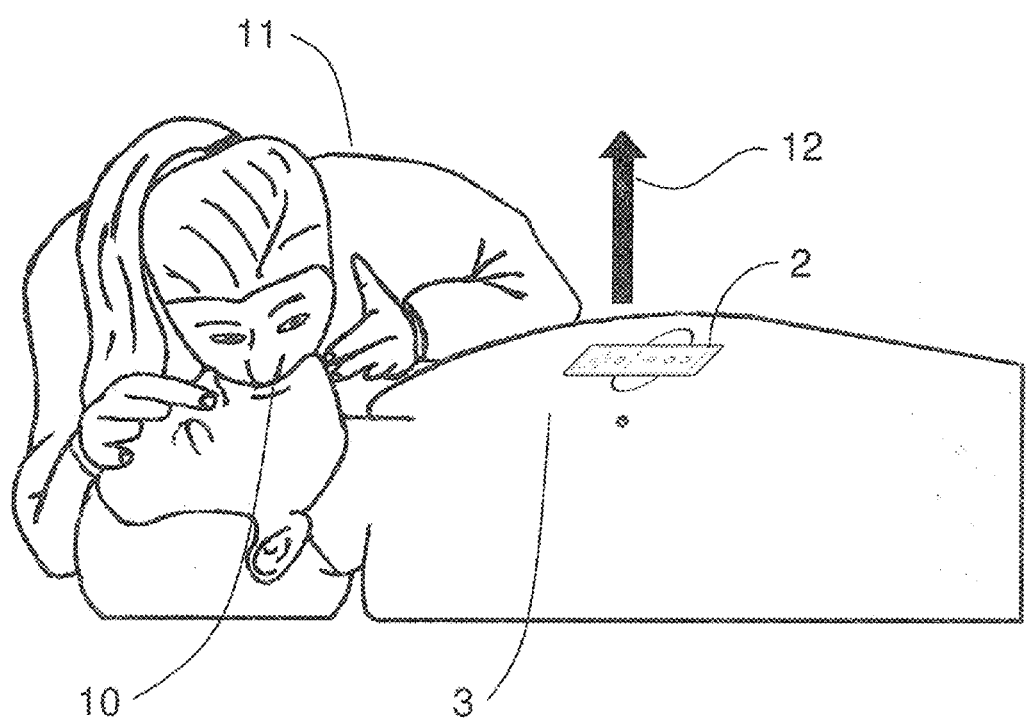
FIG. 4 is an illustration of a student delivering ventilations to an enclosure in the form of a human torso, such as the enclosure illustrated in FIG. 1, according to embodiments of the invention.

Embodiments of the present invention are also directed to a facility for detecting proper ventilations during CPR training as shown in FIG. 3. A ventilation bag 6 may be placed within the enclosure 1 and located, for instance, directly beneath the cavity 5 holding the electronic device 2. The ventilation bag 6 may be connected by a tube 7 or other air passage to an appropriate orifice on the enclosure 1. In a preferred embodiment, the enclosure 1 is a human manikin and the ventilation bag is connected to the mouth 8 and nose 9. The ventilation bag may be disposable and/or easily replaced. A proper ventilation 10 delivered by the student 11 to the manikin may inflate the ventilation bag 6 causing the electronic device 2 housed within to rise 12 as shown in FIG. 4. The amount of rise is dependent on the volume of air used to inflate the lungs of the manikin, simulated by the ventilation bag 6. The subsequent movement of the electronic device 2 caused by the inflating bag 6 may then be determined using its internal sensors, such as an accelerometer. The volume of any particular individual ventilation may be calculated by measuring how high the electronic device 2 rises during a rescue breath. The dimensions of the ventilation bag 6 are known and it is thus a simple calculation to convert chest rise to ventilation volume. Additionally, the chest movement may be directly measured based on a volume of air introduced.

Figure 5:
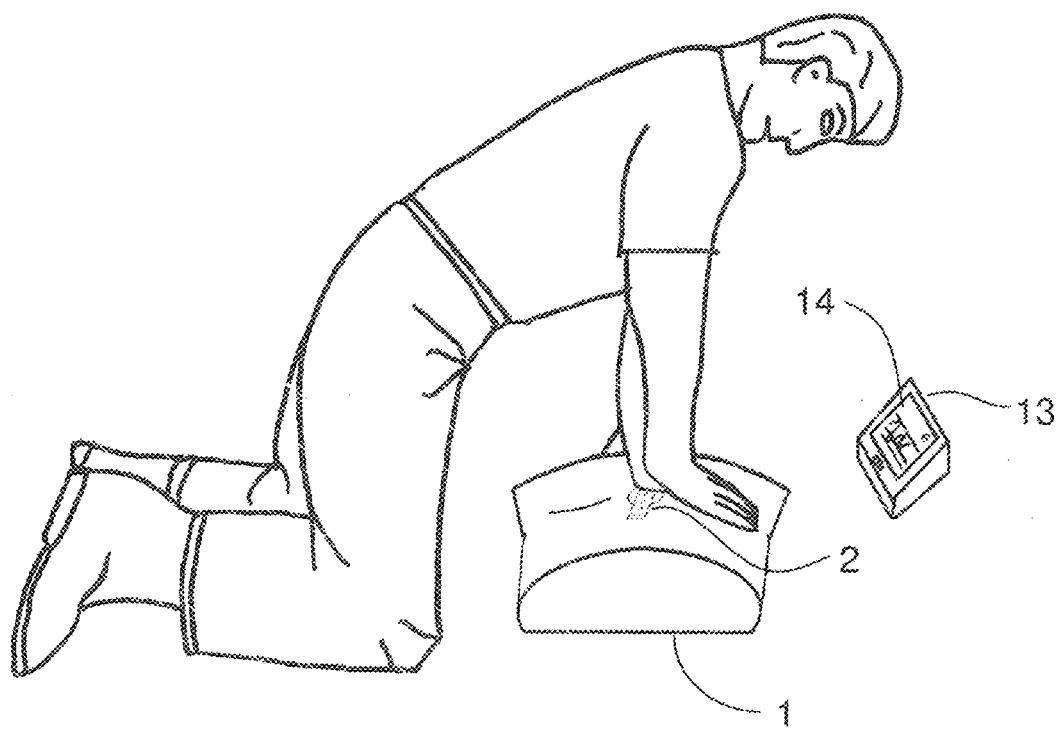
FIG. 5 is an illustration showing a student performing CPR on an enclosure in the form of a human torso, such as the enclosure illustrated in FIG. 1, with a wireless feedback display according to embodiments of the invention.

Embodiments of the present invention may also incorporate a feedback method or component capable of relaying CPR data to the student during the training process as illustrated in FIG. 5. The feedback device 13 may be a component that is separate and untethered from the enclosure as shown in FIG. 5. The feedback component may contain a display 14 and speaker for visual and audible feedback. The CPR data may be transmitted from the electronic device 2 within the enclosure 1 to the feedback component. Wireless communication facilities within the electronic device 2 may be used to communicate with a feedback component of the feedback device 13.

Figure 6:
FIG. 6 is an illustration showing a student performing CPR on an enclosure in the form of a human torso, such as the enclosure illustrated in FIG. 1, with a tethered feedback display according to embodiments of the invention.

If the electronic device 2 placed within the enclosure 1 does not have a means of wireless transmission, the feedback component may be tethered to the enclosure containing the electronic device as shown in FIG. 6. The tether 15 may connect directly to the electronic device 2 within the enclosure 1.

Figure 7:
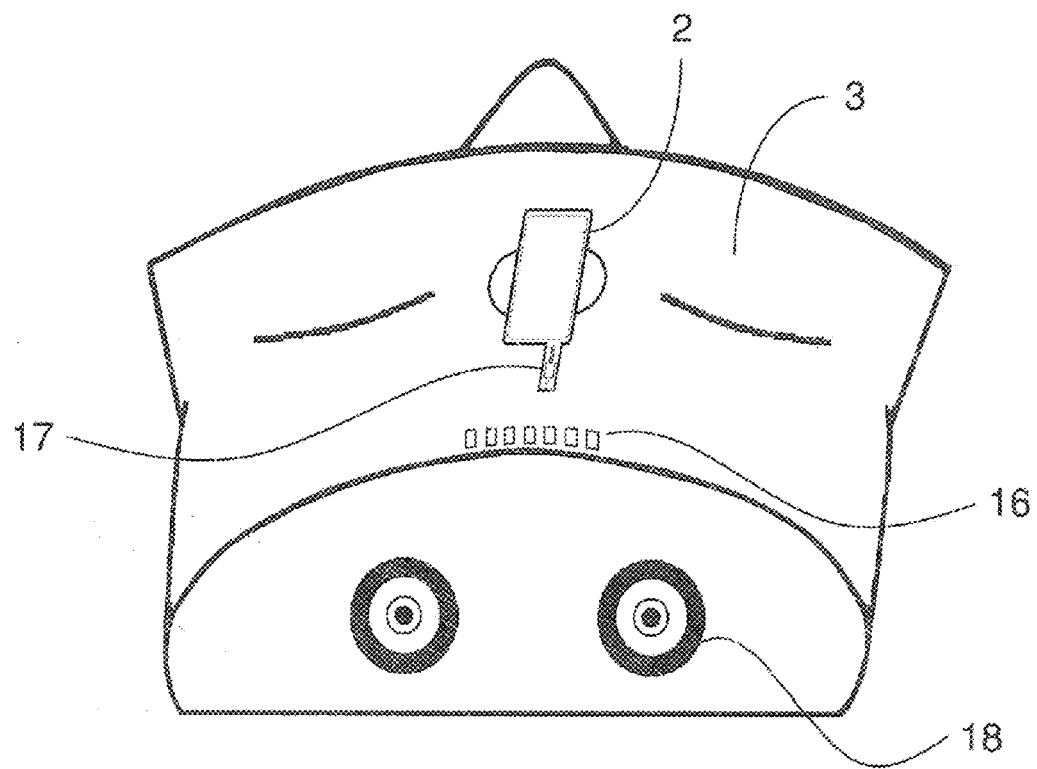
FIG. 7 is an illustration of an enclosure in the form of a human torso having feedback lights and audio speakers integrated directly into the enclosure, according to embodiments of the invention.

The feedback may also be provided directly on the enclosure 1 in the form of a display or a set of LED lights 16 as shown in FIG. 7. In one embodiment, the feedback is embedded within the chest 3 of the manikin holding the electronic device 2. The feedback embedded on the manikin may connect directly to a port or jack 17 on the electronic device 2. For example, if the embedded electronic device 2 is a phone or music player, the feedback LED lights 16 may be connected directly to the data port or audio jack on the device. Additionally, a speaker 18 and audio amplifier may be incorporated within the enclosure 1. The external speaker 18 may connect directly to the audio jack of the electronic device 2 within the enclosure 1. The audio jack connection may allow audible feedback with enhanced clarity and volume over that obtainable with the electronic device's internal speakers.

Figure 8:
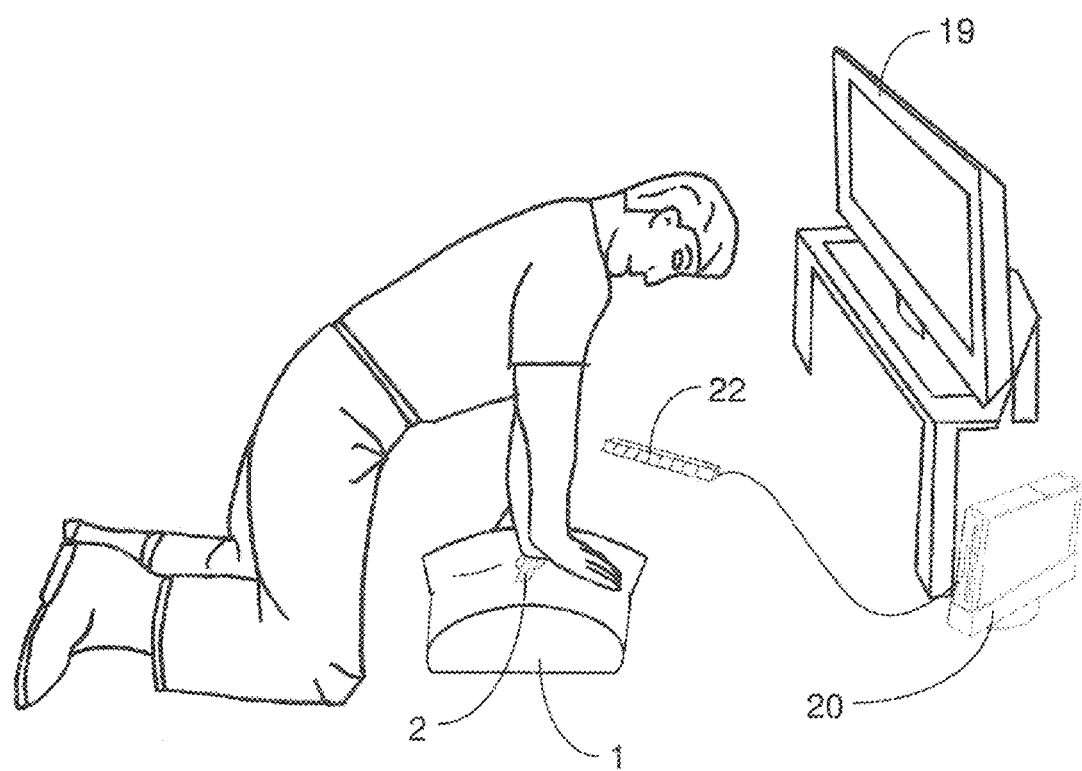
FIG. 8 is an illustration of a student performing CPR on an enclosure in the form of a human torso, such as the enclosure illustrated in FIG. 1, and housing a game console controller that is communicating with a game console connected to a television set, according to embodiments of the invention.
Figure 9:
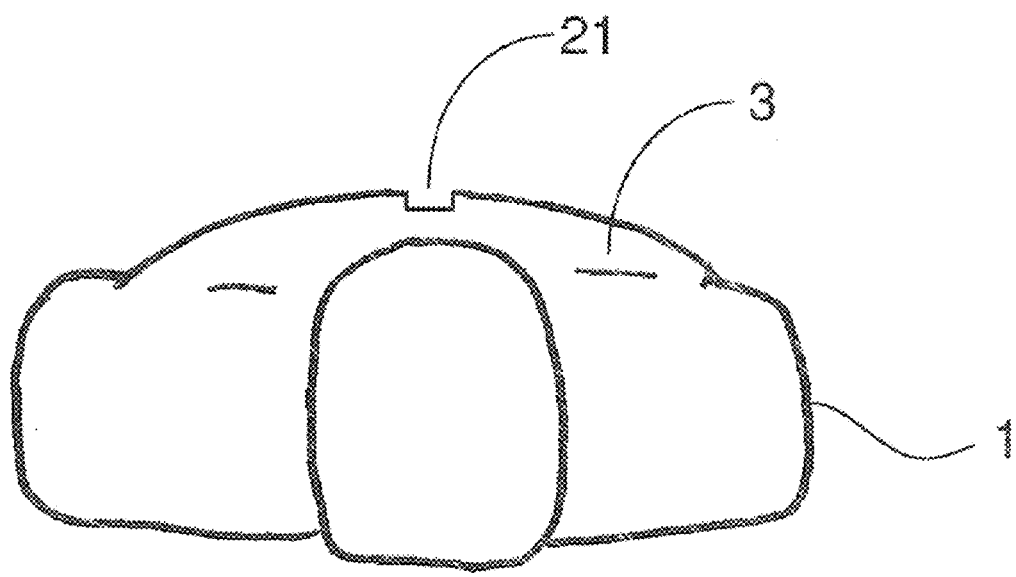
FIG. 9 is a front view of an enclosure in the form of a human torso, such as the enclosure illustrated in FIG. 1, wherein a groove is present to allow an optical sensor on an electronic device to communicate with a feedback component, according to embodiments of the invention.
Figure 10:
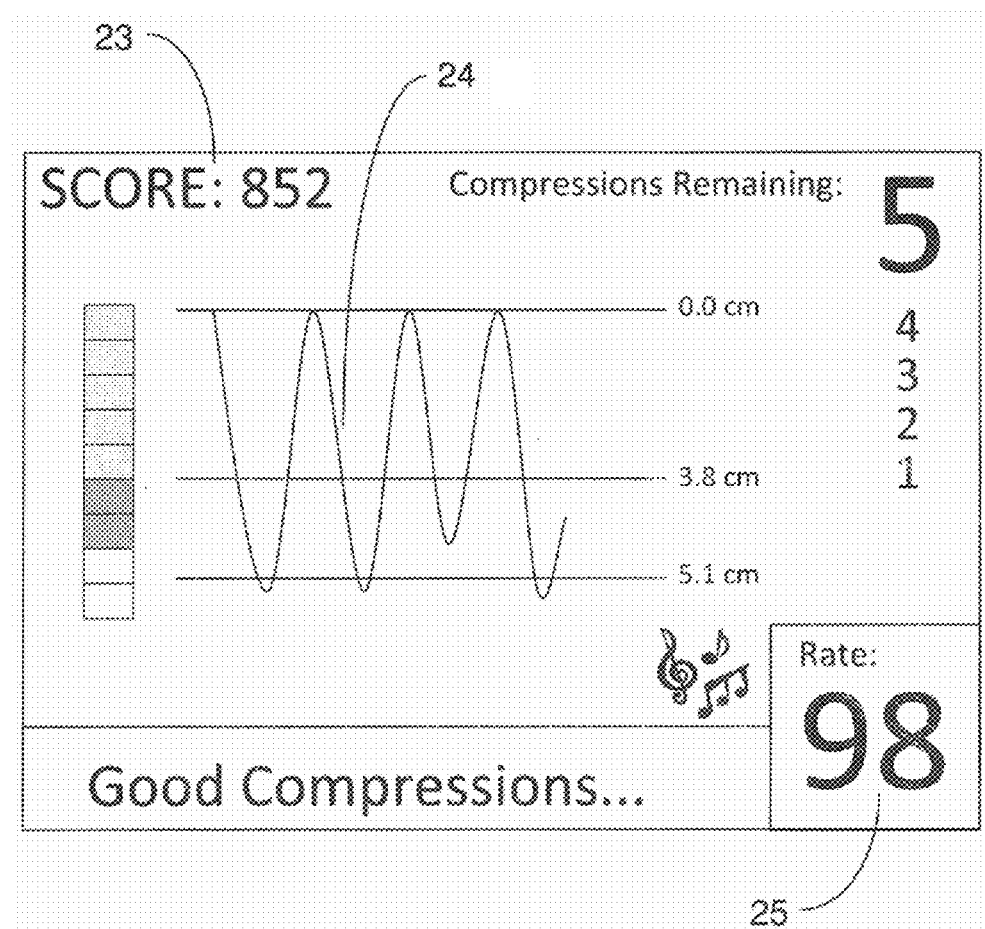
FIG. 10 is an illustration of an example display that may be used to provide a student or user feedback when embodiments of the present invention are used as part of a video game.

If the enclosed electronic device 2 is a game console controller, the feedback may be displayed on a television screen 19 and the data may be transmitted to the game console 20 wirelessly or through the controller's tether as shown in FIG. 8. In a preferred embodiment, the game console controller is a Nintendo Wii controller with an embedded accelerometer. The wireless Bluetooth connection between the console and controller may be used to transmit data to an available television display. There may also be a slot or groove 21 that allows the optical sensor of the game controller to be aligned with the LED light bar 22 of the gaming system as shown in FIG. 9. In the case of a gaming system, the feedback interface may be more detailed as the feedback is displayed on a television screen as shown in FIG. 10. The feedback may be delivered in a game format in which players have to beat each other's high scores 23. Scores may be tabulated through proper compression depth 24, compression rate 25, hand positioning, ventilations and other CPR parameters. The game may provide simulation scenarios testing various first aid skills in a diverse set of environments.

Embodiments of the present invention are capable of determining parameters relevant to the proper delivery of CPR, such as chest compression depth and rate. The parameters that may be measured are dependent on the choice of electronic device 2 placed within the enclosure. In a preferred embodiment, the electronic device placed within the enclosure 1 contains an accelerometer. Many electronic devices contain accelerometers, including digital cameras, mobile phones, portable music players, game system controllers, personal digital assistants, netbooks and many others. The depth of chest compressions may be measured using the accelerometer within the electronic device 2, such as the accelerometer inside the Apple iPhone or the Nintendo Wii game console controller. Compression depth is calculated by using a double integral of the collected acceleration data. Other algorithms known in the art may be used to derive depth data or other parameters from the accelerometer's output. Chest compression rate may also be calculated using the acceleration data and using methods presently known to those skilled in the art. The depth and rate of chest compressions may be calculated using sensor modalities other than accelerometers that are capable of resolving motion, such as the optical sensor embedded within the Nintendo Wii controller. In the case of the Nintendo Wii game console, positional information from the optical sensor and acceleration data from the accelerometer may be combined to get a more accurate measurement of compression depth and rate.

Figure 11:
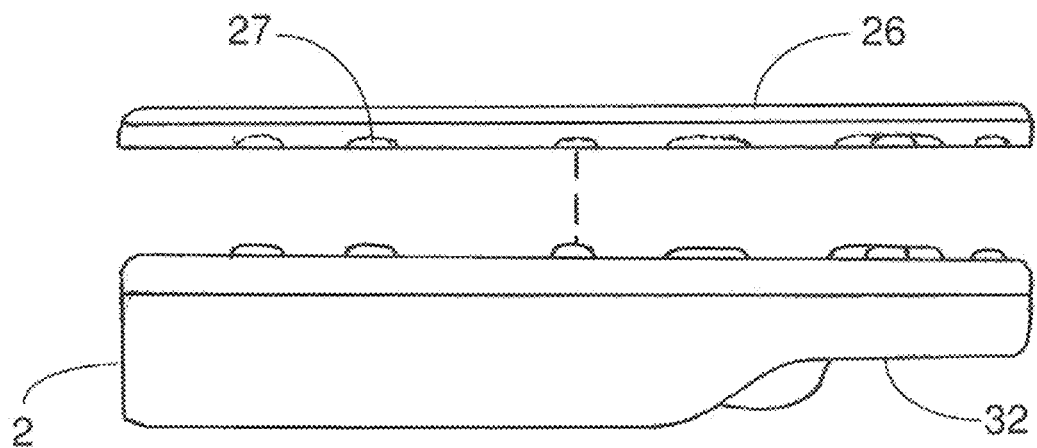
FIG. 11 is an side view of a lid that allows the activation of certain buttons during CPR to detect and measure certain parameters, according to embodiments of the invention.
Figure 12:
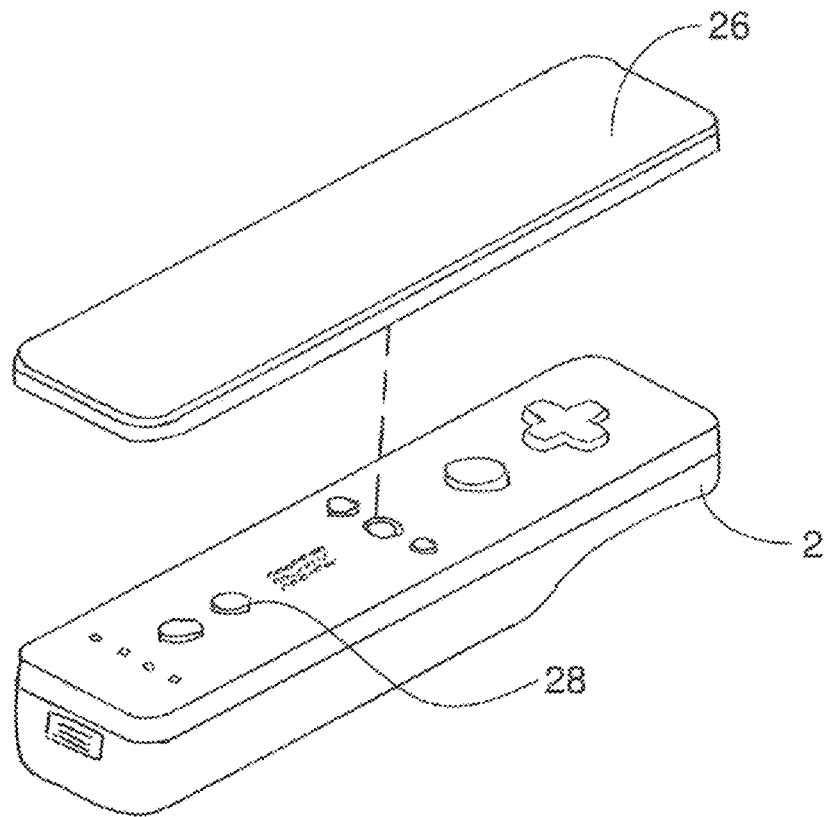
FIG. 12 is an illustration of a lid that allows the activation of certain buttons during CPR to detect and measure certain parameters touch screen of an electronic device to measure certain CPR parameters, according to embodiments of the invention.

Other CPR relevant parameters may also be determined such as chest recoil and proper hand position. Proper CPR requires full release or recoil of the chest between compressions to allow the heart to refill with blood. In one embodiment, the tactile buttons or a touch screen on the device may be used to determine proper chest recoil. As force is initially applied to the buttons or screen, they become activated denoting the start of a chest compression. As a compression nears completion, the student should allow full release of the chest resulting in a deactivation of the buttons or screen as force is removed. Once inserted into the enclosure, the electronic device 2 may be fitted with a lid 26 or cover that has protrusions and grooves 28 where certain buttons 27 are as shown in FIG. 11 and FIG. 12. Alternatively, if the electronic device 2 does not have buttons but rather has a touch sensitive display, force applied to the display may be used to detect whether chest recoil has been allowed. A special lid that fits over the touch display may provide protection so that during the CPR process only minimal force is transferred to the display area. The lid may be configured to have one padded protrusion that gently activates the screen when force is applied during the chest compression.

Figure 13:
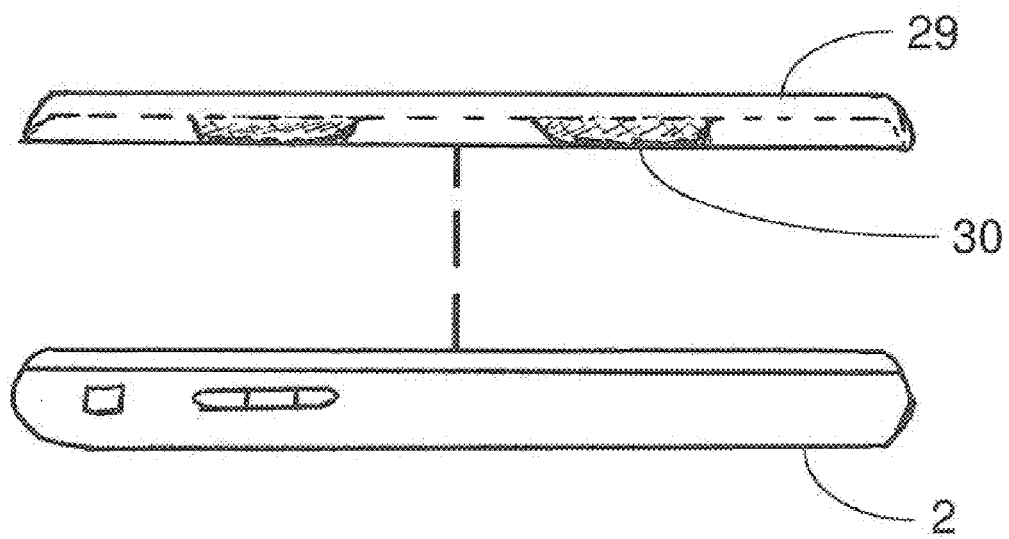
FIG. 13 is a side view of a lid that allows activation of multiple points on a touch screen of an electronic device to measure certain CPR parameters, according to embodiments of the invention.
Figure 14:
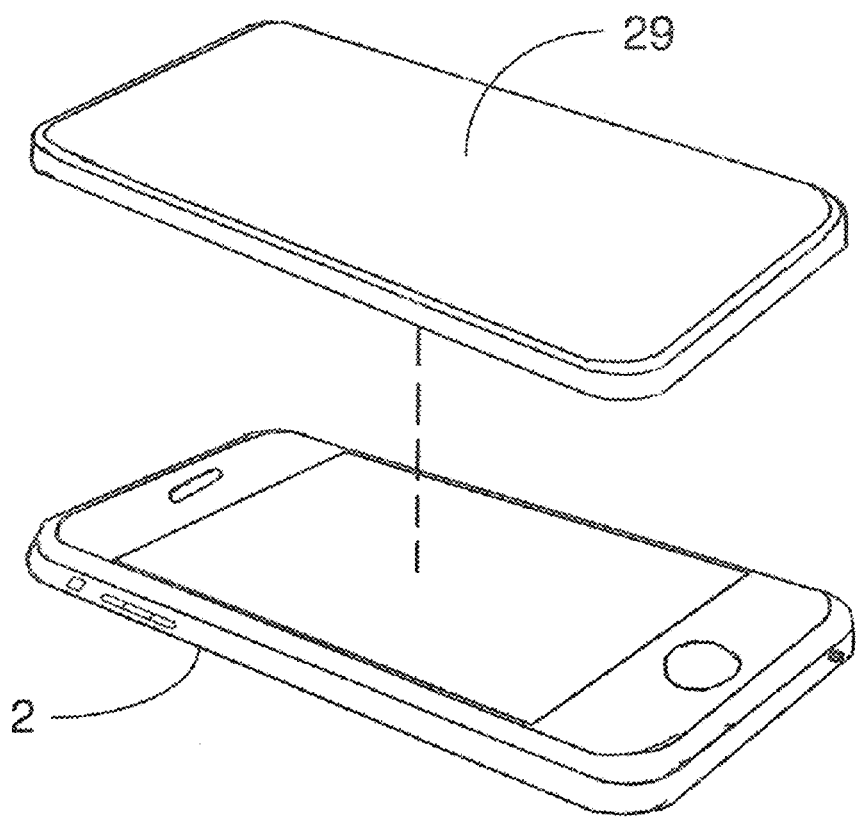
FIG. 14 is an illustration of a lid that allows activation of the multiple points on a touch screen of an electronic device to measure certain CPR parameters, according to embodiments of the invention.

Tactile buttons or a touch sensitive display on the electronic device may also be used to determine proper hand position during CPR. CPR guidelines indicate that the student's hands should be placed on the victim's sternum and between the nipples. Embodiments of the present invention may be configured so that proper hand placement during CPR activates certain buttons on the electronic device 2. These specific buttons, when activated, denote the hands being properly placed. When the hands are placed in an incorrect position, the force across the lid of the electronic device is not evenly distributed, resulting in certain buttons not being activated or the wrong buttons being activated. When the force is applied evenly and in the proper position, the correct buttons will be activated simultaneously, indicating proper hand placement. Larger grooves or depressions in the lid may be used to completely cover buttons that are desired to not be depressed during compressions. In other words, such grooves may completely prevent particular buttons on the electronic device 2 from being activated during a compression. An example button to be protected may be an on/off button of the electronic device, for instance. The touch sensitive display on certain electronic devices may be used instead of tactile buttons to determine hand position. Proper distribution of force across the display may be detected and used to determine proper hand placement. As shown in FIG. 13, the lid 29 over the electronic device may contain multiple protrusions 30 that make contact with the touch display on the electronic device. When force is evenly distributed, the protrusions will make simultaneous contact with the display indicating proper hand placement. Off-center or incorrect hand placement will not provide the even distribution of force required to activate two separate sections of the display. This is particularly suited to multi-touch display devices such as the Apple iPhone or iPod touch music player as shown in FIG. 14.

Figure 15:
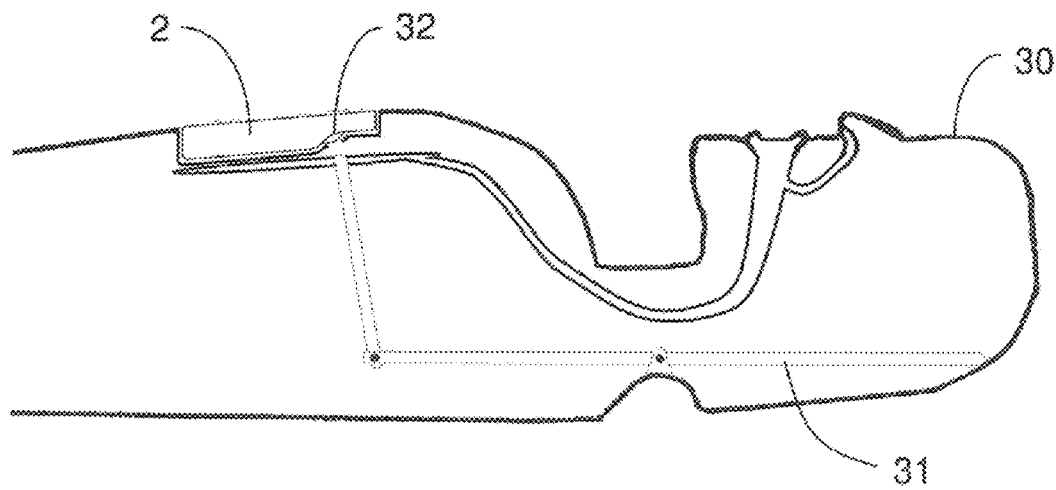
FIG. 15 is a side view of an enclosure in the form of a human torso in which head tilt and airway management skills may be measured before the head has been tilted back, according to embodiments of the invention.
Figure 16:
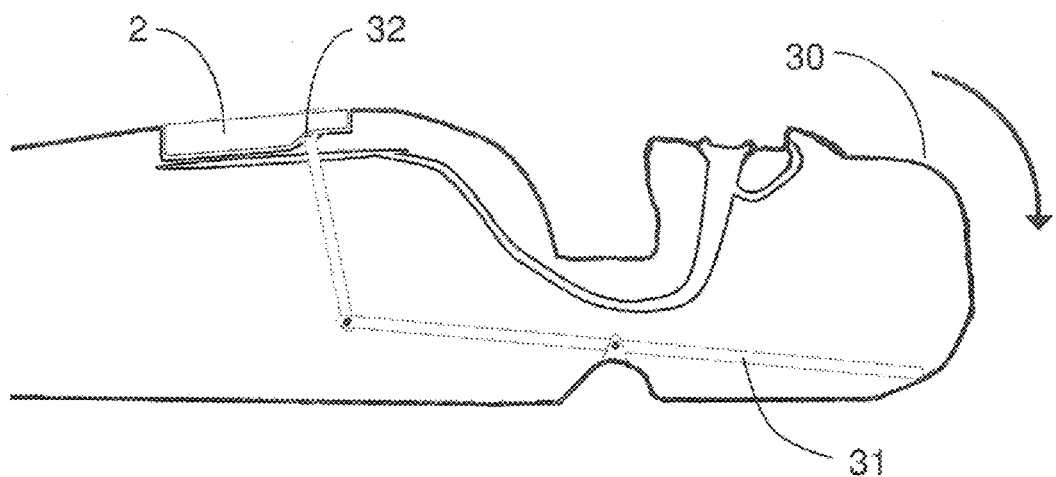
FIG. 16 is a side view of an enclosure in the form of a human torso in which head tilt and airway management skills may be measured after the head has been tilted back, according to embodiments of the invention.

When performing CPR, a number of other activities are often required to fully assess the emergency scene and the victim. Certain mechanical and electronic components may be integrated into the enclosure 1 holding the electronic device 2 so that these processes and procedures may be measured during the training process. For example, the student should carefully assess the victim's airway prior to delivering CPR and ventilations. The victim's head should be tilted gently backward so as to open the airway. In one embodiment, shown in FIG. 15, the enclosure 1 is a human manikin and the head 30 of the manikin may be tilted backward by the student causing a lever 31 or other mechanical component to gently push on and activate a button 32 on the electronic device. The activated button, as shown in FIG. 16, signals that the head tilt and airway check has been successfully completed. In another embodiment, the head tilt may activate a lever capable of pushing the electronic device up on a slight angle. As the electronic device 2 rises on an angle, the tilt may be measured by an accelerometer or other tilt sensor integrated within.

There are oral components to standard first aid procedures. For example, calling 9-1-1 or the appropriate emergency number for assistance, shouting at the victim to ascertain consciousness or instructing another rescuer to get help are all verbal aspects of first aid. These verbal commands may be recorded by the electronic device 2 if it has an embedded speaker. For example, if the electronic device 2 is an iPhone, it may be configured to detect certain verbal commands received through its phone microphone or speaker. Feedback on the successful completion of the verbal commands involved in CPR may be relayed to the student through the speaker.

Certain embodiments of the present invention may allow defibrillator training. In one embodiment, training defibrillator electrode pads may be placed by the student on the enclosure 1 holding the electronic device 2. The proper placement of the electrode pads may depress certain buttons on the electronic device 2. The activation of these buttons may allow the electronic device 2 to detect the proper placement of the defibrillator electrodes.

Figure 17:
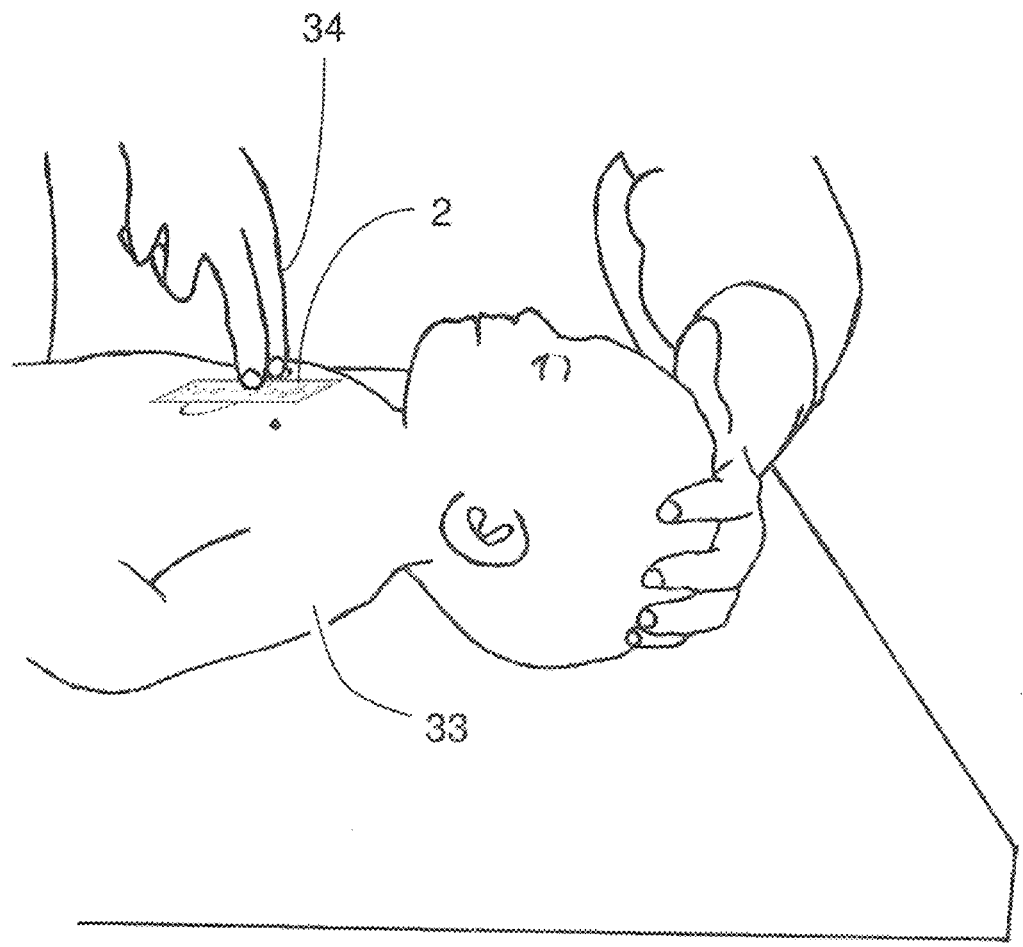
FIG. 17 is an illustration of an enclosure in the form of an infant human torso for the training of pediatric CPR, according to embodiments of the invention.

The present invention may take various forms. The enclosure 1 may be in the likeness of a human body for accurate CPR training. The enclosure may be a normal adult manikin, or it may be an infant manikin for training the student in proper pediatric CPR as shown in FIG. 17. The infant manikin 33 may be similar to the adult manikin but requires the student to compress the chest with two fingers 34. The enclosure may also be designed to represent non-ideal scenarios such as overweight victims or animal victims.

What is claimed is:

1. A device for the determination of CPR parameters during first aid training comprising:
   an enclosure, wherein the enclosure is a manikin; and
   a receiver disposed in the enclosure and structured to physically support a portable electronic device, wherein a mechanism coupled between a head of the manikin and the portable electronic device tilts the portable electronic device and causes a button on the portable electronic device to be pushed when the head of the manikin is tilted backward.

2. The device of claim 1 wherein the portable electronic device has a touch sensitive display.

3. The device of claim 2 wherein the touch sensitive display is used to measure chest recoil.

4. The device of claim 2 wherein the touch sensitive display is used to measure proper hand position during performance of the CPR actions on the manikin.

5. The device of claim 1 wherein the manikin is in the form of a human adult.

6. The device of claim 1 wherein the manikin is in the form of a human baby.

7. The device of claim 1 wherein the manikin is in the form of an animal.

8. The device of claim 1 wherein the manikin is in the form of an object capable of being compressed.

9. The device of claim 1 wherein verbal commands or cues may be detected by the portable electronic device.

10. The device of claim 9 wherein the verbal commands are calling for help or checking the responsiveness of the victim.

11. The device of claim 1 further comprising a feedback device that is communicatively coupled with the portable electronic device, tethered to the manikin, and configured to provide feedback of CPR actions being performed on the manikin.

12. The device of claim 1 wherein the portable electronic device is any of a camera, a mobile phone, a portable music player, a video game console controller, a personal digital assistant, or a computer.

13. The device of claim 12 wherein the portable electronic device includes an accelerometer.

14. The device of claim 13 wherein data output from the accelerometer is used to measure compression depth.

15. The device of claim 13 wherein data output from the accelerometer is used to measure compression rate.

16. The device of claim 13 wherein data output from the accelerometer is used to measure compression angle.

17. The device of claim 12 wherein the portable electronic device has tactile buttons.

18. The device of claim 17 wherein the tactile buttons are used to determine adequate chest recoil during CPR.

19. The device of claim 17 wherein the tactile buttons are used to detect proper hand position.

20. The device of claim 1 further comprising a spring positioned within the manikin and under the portable electronic device.

21. The device of claim 20 wherein the manikin having the spring matches the compliance of a human chest.

22. The device of claim 1 further comprising a ventilation bag positioned within the manikin and beneath the electronic device.

23. The device of claim 22 wherein the ventilation bag is connected to a mouth and nose of the manikin.

24. The device of claim 23 wherein a ventilation breath delivered by a user causes the ventilation bag to fill and a chest portion of the manikin to rise.

25. The device of claim 24 wherein the rising of the chest portion of the manikin causes the rising of the portable electronic device.

26. The device of claim 25 wherein the rise of the electronic device is measured by data output from an internal accelerometer of the portable electronic device.

27. The device of claim 12 wherein proper placement of defibrillator electrode pads may be determined through activation of buttons on the portable electronic device.

28. A device for the determination of CPR parameters during first aid training comprising:

an enclosure, wherein the enclosure is a manikin; and a receiver disposed in the enclosure and structured to physically support a portable electronic device, wherein the portable electronic device comprises tactile buttons and wherein a mechanism coupled between a head of the manikin and the portable electronic device activates a button on the electronic device when the head of the manikin is tilted backward.

29. The device of claim 28 wherein the portable electronic device is any of a camera, a mobile phone, a portable music player, a video game console controller, a personal digital assistant, or a computer.

30. The device of claim 28 further comprising a spring positioned within the manikin and under the portable electronic device.

31. The device of claim 28 further comprising a ventilation bag positioned within the manikin and beneath the electronic device.

32. The device of claim 28 wherein the portable electronic device has a touch sensitive display.

33. The device of claim 28 wherein the manikin is in the form of a human adult.

34. The device of claim 28 wherein the manikin is in the form of a human baby.

35. The device of claim 28 wherein the manikin is in the form of an animal.

36. The device of claim 28 wherein the manikin is in the form of an object capable of being compressed.

* * * * *